(12) United States Patent
Musil et al.

(10) Patent No.: US 7,753,626 B2
(45) Date of Patent: Jul. 13, 2010

(54) MICRO-ADJUSTABLE DIFFERENTIAL SCREW ASSEMBLY

(75) Inventors: John C. Musil, Mantua, OH (US); Thomas P. Quatkemeyer, Kent, OH (US)

(73) Assignee: Kennametal Inc., Latrobe, PA (US)

( * ) Notice: Subject to any disclaimer, the term of this patent is extended or adjusted under 35 U.S.C. 154(b) by 654 days.

(21) Appl. No.: 11/654,843

(22) Filed: Jan. 18, 2007

(65) Prior Publication Data

US 2008/0175682 A1 Jul. 24, 2008

(51) Int. Cl.
*B23B 29/00* (2006.01)

(52) U.S. Cl. .................. 408/181; 408/153; 408/186; 407/39

(58) Field of Classification Search ............. 407/37–39, 407/44–46; 408/181, 153, 186; 74/89.23, 74/89.37, 89.45; *B23B 41/16, 29/02, 29/034, B23B 29/00, 29/03*
See application file for complete search history.

(56) References Cited

U.S. PATENT DOCUMENTS

| | | | | |
|---|---|---|---|---|
| 2,125,005 A * | 7/1938 | Jearum | ..................... | 407/74 |
| 2,338,271 A | 1/1944 | Ulanet | | |
| 2,456,844 A | 12/1948 | Smith | | |
| 2,823,563 A * | 2/1958 | Nipken | ..................... | 408/110 |
| 2,913,935 A * | 11/1959 | Flannery et al. | ............. | 408/198 |
| 2,915,925 A * | 12/1959 | Nipken | ..................... | 408/113 |
| 3,152,493 A * | 10/1964 | Sullivan et al. | ............. | 408/153 |
| 3,402,618 A | 9/1968 | Roantree | | |
| 3,628,386 A | 12/1971 | Blum | | |
| 3,700,313 A | 10/1972 | Karr et al. | | |
| 3,727,471 A | 4/1973 | Botos | | |
| 3,937,587 A | 2/1976 | Lindem et al. | | |
| 4,043,697 A | 8/1977 | Eckle | | |
| 4,298,248 A | 11/1981 | Lapp | | |
| 4,311,418 A * | 1/1982 | Erkfritz et al. | ................ | 407/39 |
| 4,710,073 A | 12/1987 | Peterson | | |
| 4,878,787 A | 11/1989 | Hunt | | |
| 5,120,166 A * | 6/1992 | Woerner | ..................... | 407/12 |
| 6,183,174 B1 | 2/2001 | Kaiser et al. | | |
| 6,913,427 B2 | 7/2005 | Erickson et al. | | |

(Continued)

FOREIGN PATENT DOCUMENTS

DE 204639 A1 * 12/1983

(Continued)

*Primary Examiner*—Daniel W Howell
(74) *Attorney, Agent, or Firm*—Larry R. Meenan (57) ABSTRACT

A micro-adjustable differential screw assembly for providing fine adjustment of the axial and/or radial position of a cutting insert is disclosed. The micro-adjustable differential screw assembly can be mounted directly to a boring bar or to a mounting cartridge, which in turn, can be mounted to the boring bar. An axial micro-adjustable differential screw assembly provides fine adjustment of an axial position of the cutting insert, while a radial micro-adjustable differential screw assembly provides fine adjustment of a radial position of the cutting insert. The differential screw assembly includes a rotatable drive screw with threads of different thread pitches, and a non-rotatable adjusting screw with threads for mating with the drive screw. The difference in the thread pitches of the drive screw causes a greatly reduced axial and radial movement of the boring cartridge in relation to the relative movement of the drive screw, thereby providing fine adjustment in the axial and radial position of the cutting insert.

15 Claims, 7 Drawing Sheets

U.S. PATENT DOCUMENTS 7,029,210 B2 * 4/2006 Schlagenhauf .............. 408/153

FOREIGN PATENT DOCUMENTS

| DE | 294207 | A5 | * | 9/1991 |
|---|---|---|---|---|
| DE | 19649143 | A1 | * | 6/1997 |
| GB | 2189863 | A | * | 11/1987 |
| JP | 09174311 | A | * | 7/1997 |
| JP | 2006123037 | A | * | 5/2006 |
| JP | 2006-136970 | A | | 6/2006 |
| SU | 435070 | A | * | 11/1974 |

* cited by examiner

"MICRO-ADJUSTABLE DIFFERENTIAL SCREW ASSEMBLY"

BACKGROUND OF THE INVENTION

Many devices exist in which a component must be positioned with extreme accuracy and the position adjusted from time to time. Such a component, for example, is a boring cartridge that is mounted on a boring tool. Screw mechanisms, such as differential screws or compound screws, are conventionally used to provide fine adjustment of the cutting insert to compensate for wear of the insert. By definition, a compound screw is a screw having on the same axis two or more screws with different pitch, or running in different directions (a right and left screw), and a differential screw is a compound screw by which a motion is produced equal to the difference of the motions of the component screws. The difficulty with conventional screw mechanisms, however, is that when presented with a bore that has tolerance limits in the range of plus or minus 0.0002 to 0.0030 inches, most products are limited to a single bore per tool and/or can be fairly expensive.

Thus, there is a need to provide a boring cartridge that includes both axial and radial micro-adjustable screw assemblies that provide fine adjustment of the cutting insert in both the axial and radial directions, while capable of being used in a boring bar with a diameter that is substantially smaller than conventional boring bars having generally similar cutting insert mountings.

BRIEF SUMMARY OF THE INVENTION

Briefly, according to this invention, there is provided a boring bar comprising a shank portion; and a head portion with at least one boring cartridge mounted thereto, said at least one boring cartridge an axial micro-adjustable differential screw assembly for adjusting an axial position of a cutting insert, and a radial micro-adjustable differential screw assembly for adjusting a radial position of said cutting insert.

In another embodiment, a boring cartridge comprises an axial micro-adjustable differential screw assembly for adjusting an axial position of a cutting insert; and a radial micro-adjustable differential screw assembly for adjusting a radial position of said cutting insert.

In yet another embodiment, a micro-adjustable differential screw assembly comprises a rotatable drive screw including a shaft portion with a bore having internal threads with a first thread pitch and external threads with a second thread pitch different than said first thread pitch, and a non-rotatable adjusting screw including a shaft portion having external threads with said first thread pitch, said shaft portion of said adjusting screw being received in said bore of said drive screw.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Figure 1:
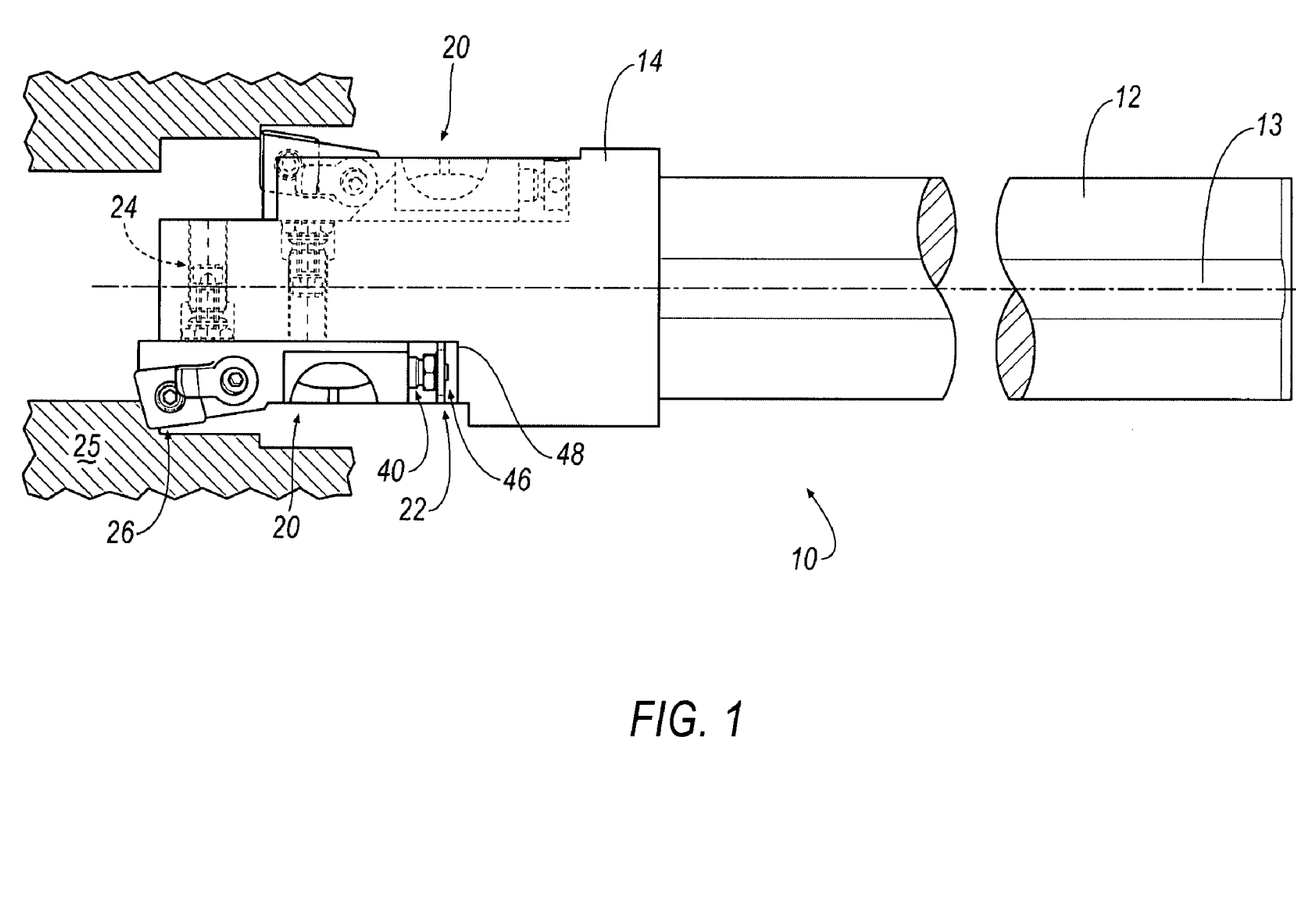
FIG. 1 is a partial perspective view of a dual-cartridge boring tool with at least one micro-adjustable differential screw assembly according to an embodiment of the invention.

Referring now to FIG. 1, a boring bar 10 with one or more mounting cartridges 20 with micro-adjustable differential screw assemblies 22, 24 to perform a finish boring operation on holes within a workpiece 25 is shown according to an embodiment of the invention. Alternatively, the micro-adjustable screw assemblies 22, 24 can be mounted directly to the boring bar 10 without the need of the mounting cartridges 20. The boring bar 10 includes a shank portion 12 with a longitudinal axis 13 and having a diameter, for example, of approximately 1.50 inches, and a head portion 14 at which the boring or mounting cartridge(s) 20 are slidably and non-rotatably mounted thereto. In the illustrated embodiment, two substantially identical mounting cartridges 20 are shown, so only one mounting cartridge 20 will be described in detail below for brevity.

Figure 2:
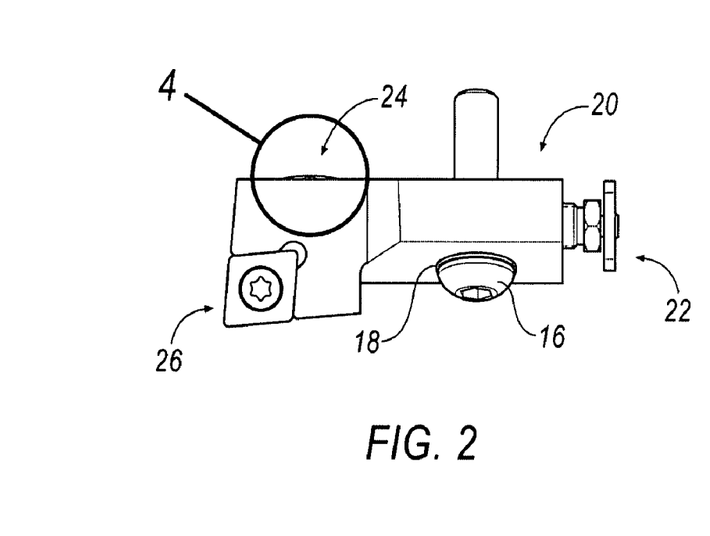
FIG. 2 is a top perspective view of a mounting cartridge with axial and radial micro-adjustable screw assemblies according to an embodiment of the invention.
Figure 3:
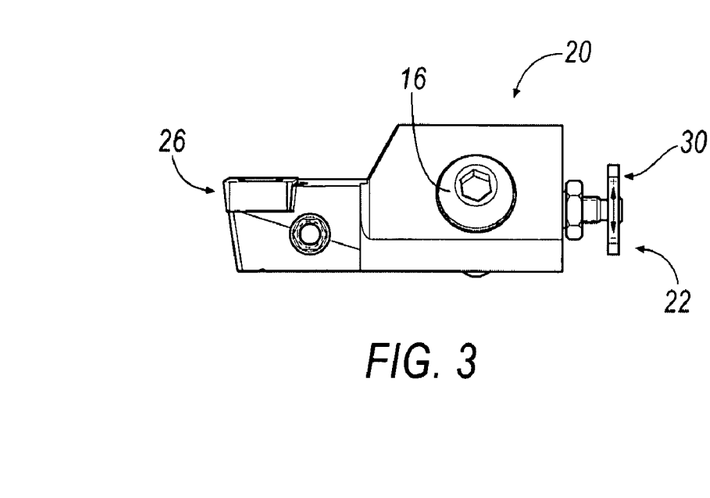
FIG. 3 is a side view of the mounting cartridge of FIG. 2.
Figure 4:
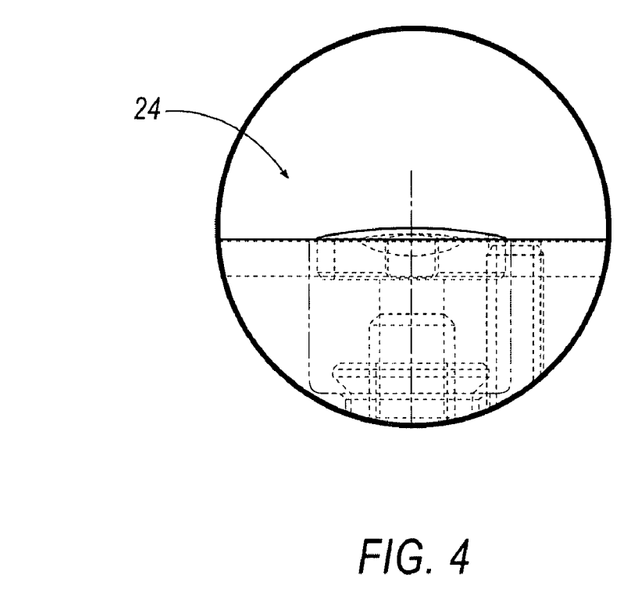
FIG. 4 is an enlarged view of a radial micro-adjustable screw assembly (shown in phantom) as outlined by the encircled area of FIG. 3 according to an embodiment of the invention.

Referring now to FIGS. 2-4, each cartridge 20 includes an axial micro-adjustable differential screw assembly 22 (shown in phantom) for axial adjustment of the cartridge 20 and a radial micro-adjustable differential screw assembly 24 for radial adjustment of the cartridge 20 in fine increments on the order of 0.0001 to 0.0002 inches to compensate for wear, size variations, and the like, of an indexable cutting insert 26. It will be appreciated that the cartridge 20 may include only the axial assembly 22 or only the radial assembly 24, if desired. Each cartridge 20 is slidably and non-rotatably mounted to the head portion 14 by a mounting bolt 16 that is threadably received in the head portion 14 at a pre-selected angular orientation. A spring or wave washer 18 may be disposed between the head of the mounting bolt 16 and the head portion 14 to provide a radial bias against the mounting bolt 28.

Figure 5:
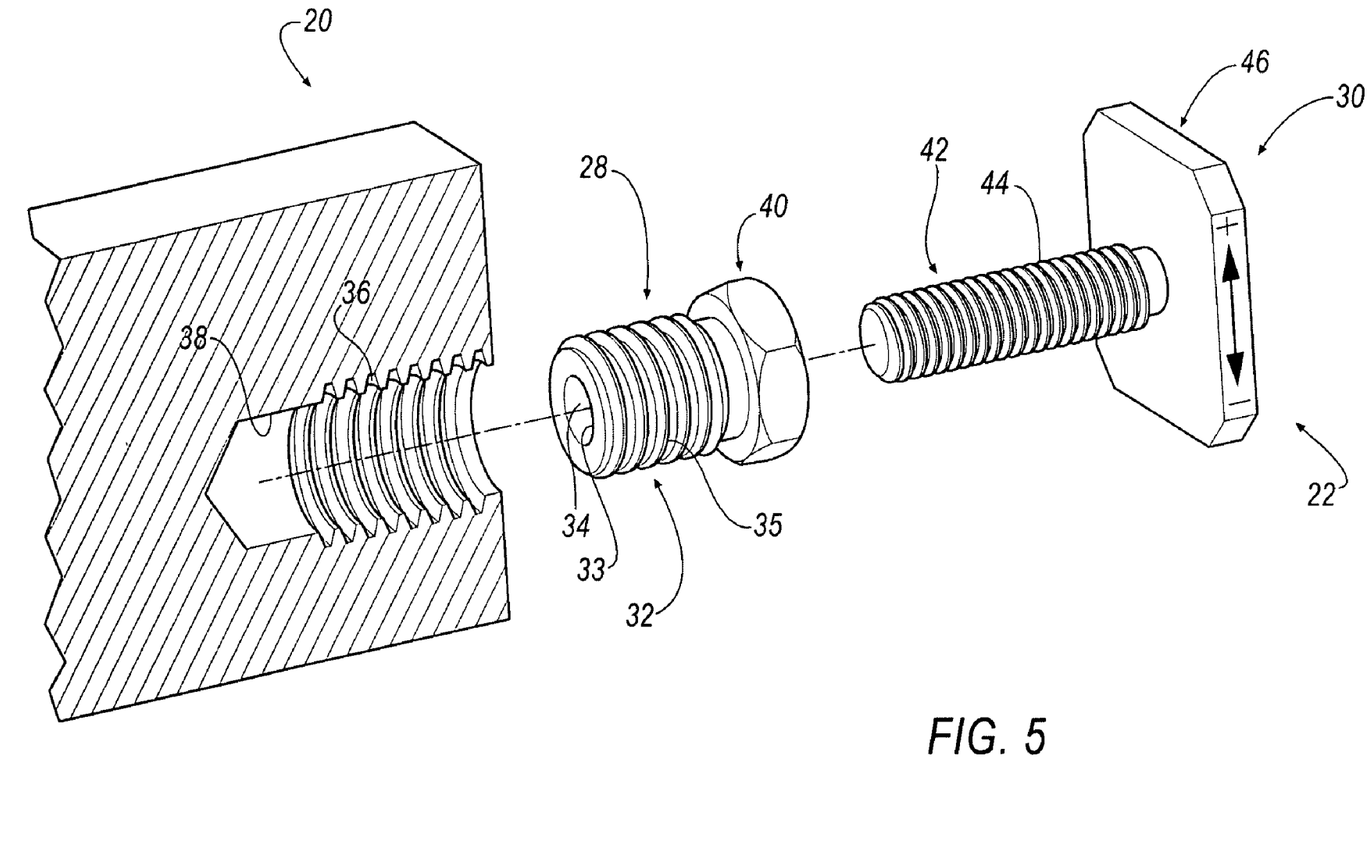
FIG. 5 is an exploded partial cross-sectional view of an axial micro-adjustable differential screw assembly according to an embodiment of the invention.

Referring now to FIG. 5, the axial micro-adjustable screw assembly 22 includes a rotatable female drive screw 28 and a non-rotatable male adjusting piston or adjusting screw 30. The drive screw 28 includes a shaft portion 32 with a bore 33 having, for example, with left-hand internal threads 34 having a pitch of approximately 0.5 mm/revolution. The drive screw 28 also includes external threads 35 having a pitch of approximately 0.5 mm/revolution for mating with threads 36 in a bore 38 of the boring cartridge 20. The drive screw 28 includes a hexagonal head portion 40 capable of being rotated by a tool, such as an open end wrench, and the like.

The adjusting screw 30 includes a shaft portion 42 with, for example, left-hand external threads 44 having a pitch of approximately 0.6 mm/revolution that is received within the bore 33 of the drive screw 28. The adjusting screw 30 also includes a non-rotatable, substantially square-shaped head portion 46. It will be appreciated that the invention can be practiced with right-hand threads on the drive screw 28 and the adjusting screw 30, rather than the left-hand threads 34, 44, so long as the threads are the same hand.

Figure 6:
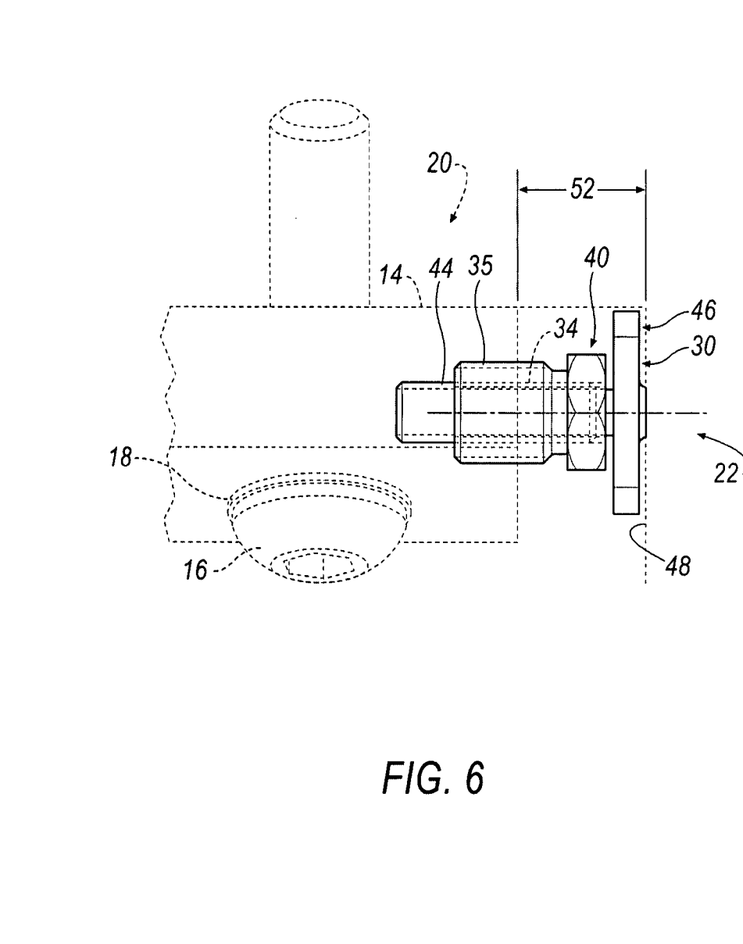
FIG. 6 is a top cutaway view of a mounting cartridge with an axial micro-adjustable differential screw assembly (shown in phantom) according to an embodiment of the invention.
Figure 7:
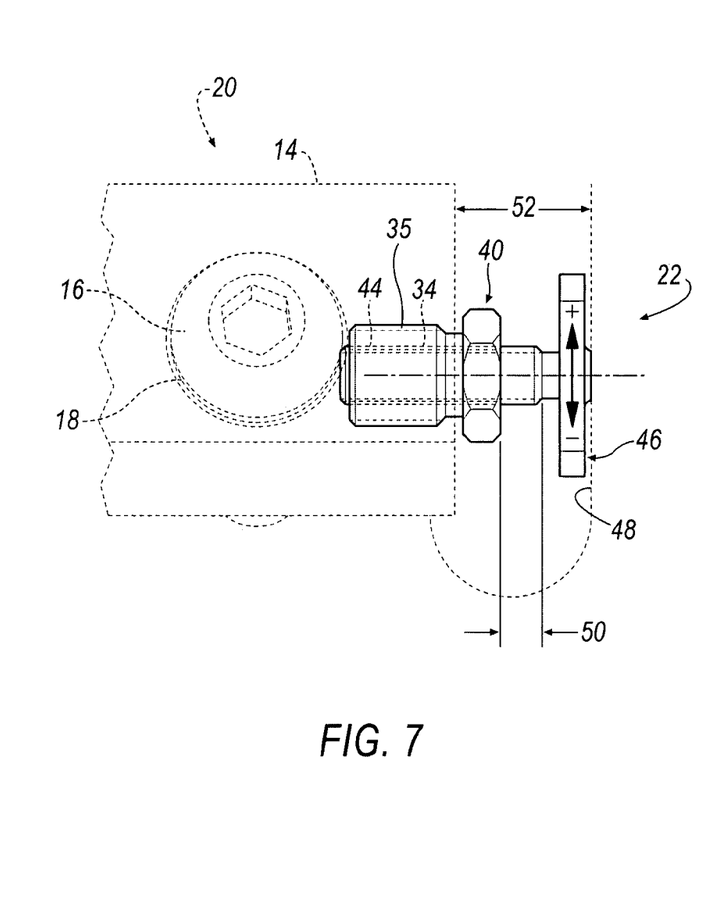
FIG. 7 is a side cutaway view of the mounting cartridge with an axial micro-adjustable differential screw assembly (shown in phantom) of FIG. 6 according to an embodiment of the invention.

Referring now to FIGS. 6 and 7, the head portion 46 abuts a shoulder 48 when the cartridge 20 is mounted on the head portion 14 of the boring bar 10. In operation, as the female drive screw 28 is turned by the appropriate tool, such as an open end wrench, an Allen wrench, and the like. The difference in the pitches of the two threads 34, 44 causes a greatly reduced axial movement of the boring cartridge 20 in relation to the axial movement of the drive screw 28, thereby providing fine adjustment in the axial position of the cutting insert 26.

For example, as shown in FIG. 6, the drive screw 28 is in the fully outward position in which the head portion 40 of the drive screw 28 is proximate the head portion 46 of the adjusting screw 30. In the fully outward position, a distance 52 between the boring cartridge 20 and the shoulder 48 is approximately 0.305 inches (7.750 mm). As shown in FIG. 7, the drive screw 28 has traveled a distance 50 of approximately 0.098 inches (2.500 mm) after five wrench turns, while the distance 52 between the boring cartridge 20 and the shoulder 48 of the head portion 14 of the boring bar 10 is approximately 0.325 inches (8.250 mm), providing a difference of approximately 0.020 inches (0.50 mm) from the fully outward position of the drive screw 28 as shown in FIG. 6. Thus, the distance of approximately 0.50 mm that the boring cartridge 20 is adjusted outwardly is equal to the number of turns made by the drive screw 28 multiplied by the difference between the pitches of the internal threads 34 and the external threads 35 of the drive screw 28 (i.e., 5 times 0.10 mm=0.50 mm).

Figure 8:
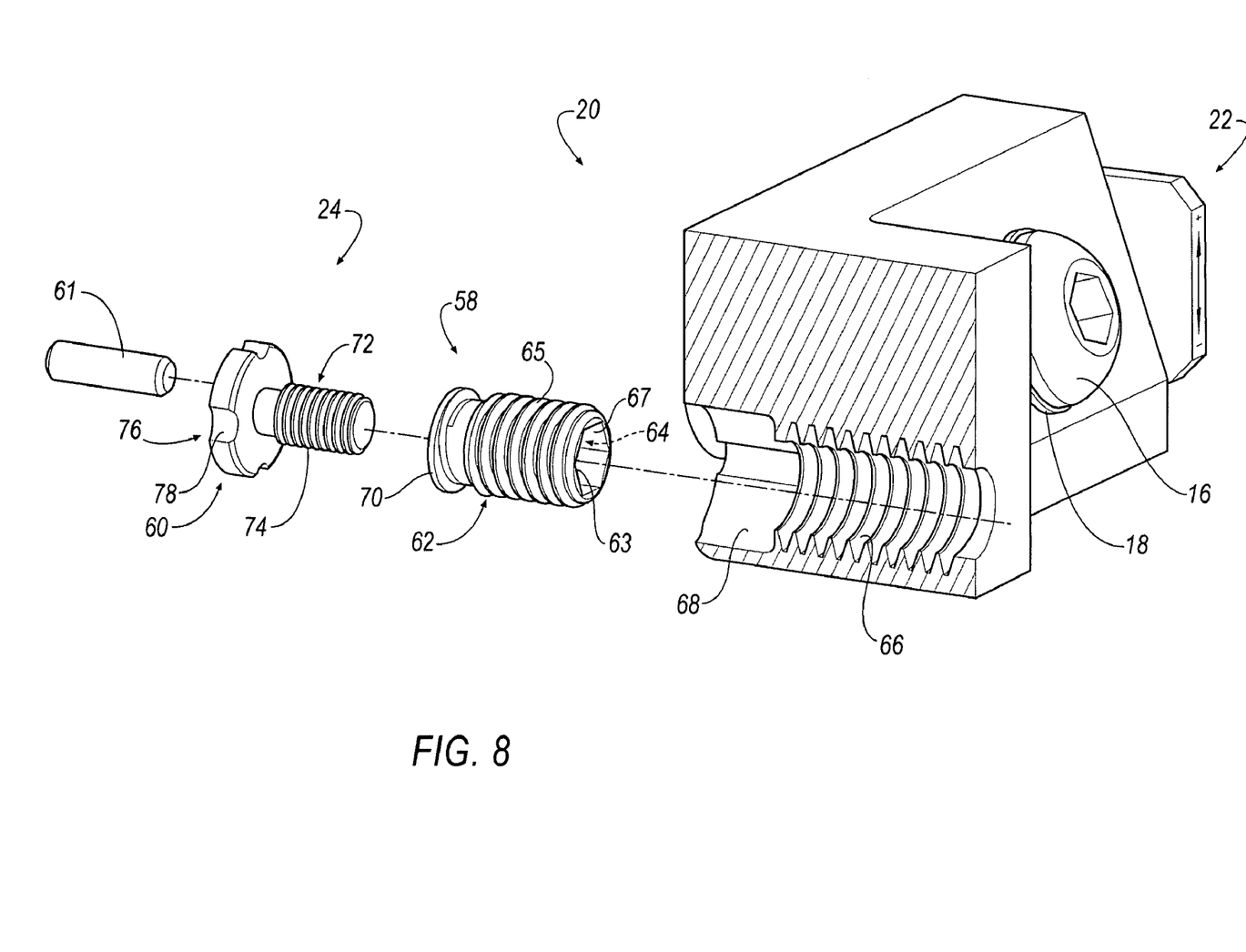
FIG. 8 is an exploded partial cross-sectional view of a mounting cartridge with the axial micro-adjustable differential screw assembly of FIG. 6 and a radial micro-adjustable differential screw assembly according to an embodiment of the invention.

Referring now to FIG. 8, the radial micro-adjustable screw assembly 24 includes a rotatable female drive screw 58, a non-rotatable male adjusting piston or adjusting screw 60, and an anti-rotation device 61 for preventing rotation of the adjusting screw 60, such as a pin, a screw, a bolt, and the like. In the illustrated embodiment, the anti-rotation device 61 comprises a spring pin. The drive screw 58 includes a shaft portion 62 with a bore 63 having, for example, with left-hand internal threads 64 having a pitch of approximately 0.6 mm/revolution. The drive screw 58 also includes external threads 65 having a pitch of approximately 0.5 mm/revolution for mating with threads 66 in a bore 68 of the boring cartridge 20. The drive screw 58 includes a head portion or flange 70 at one end thereof that acts as a stop and limits travel of the drive screw 58 during operation of the screw assembly 24. The drive screw 58 also includes a socket 67 for receiving an appropriate tool, such as an Allen wrench and the like, at the other end thereof.

The adjusting screw 60 includes a shaft portion 72 with, for example, left-hand external threads 74 having a pitch of approximately 0.6 mm/revolution. The adjusting screw 60 also includes a head portion 76 with one or more notches 78 along the outer circumference thereof. The one or more notches 78 interface with the spring pin or screw 61 to prevent rotation of the adjusting screw 60. It will be appreciated that the invention can be practiced with right-hand threads on the drive screw 58 and the adjusting screw 60, rather than the left-hand threads 64, 74, so long as the threads are the same hand.

Figure 9:
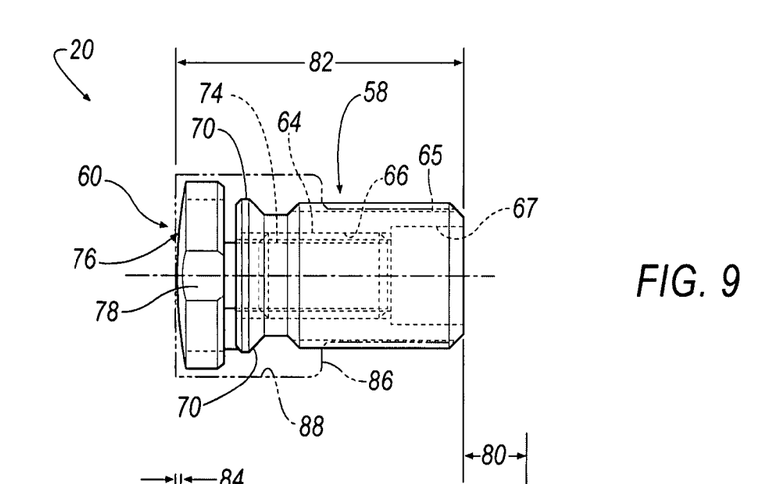
FIG. 9 is a top cutaway view of the mounting cartridge and the radial micro-adjustable differential screw assembly (shown in phantom) of FIG. 8 according to an embodiment of the invention.
Figure 10:
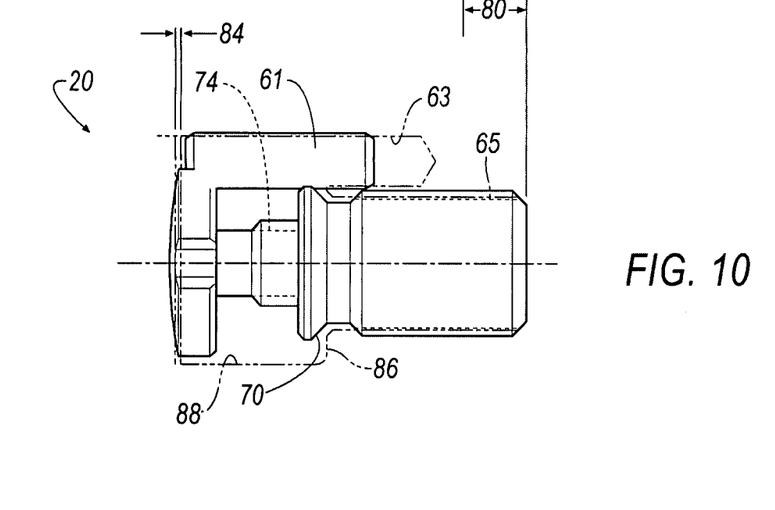
FIG. 10 is a side cutaway view of the mounting cartridge and the radial micro-adjustable differential screw assembly (shown in phantom) of FIG. 8 according to an embodiment of the invention.
Figure 11:
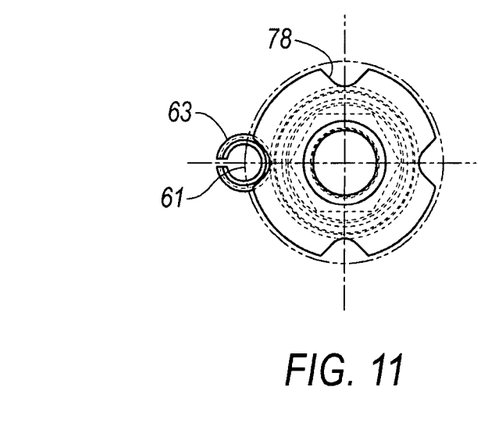
FIG. 11 is an end view of the radial micro-adjustable differential screw assembly of FIG. 8.

Referring now to FIGS. 9-11, the spring pin 61 is received within a bore 63 of the cartridge 20 when mounted on the head portion 14 of the boring bar 10. Alternatively, the spring pin 61 can be mounted directly to a bore in the boring bar 10. In operation, as the female or drive screw 58 is turned by the tool, such as an open end wrench, an Allen wrench, and the like, the difference in the pitches of the two threads 64, 74 causes a greatly reduced radial movement of the boring cartridge 20 in relation to the radial movement of the drive screw 58, thereby providing fine adjustment in the radial position of the cutting insert 26.

For example, as shown in FIG. 9, the drive screw 58 is in the fully outward position in which the head portion or flange 70 of the drive screw 58 is proximate the head portion 76 of the adjusting screw 60. In the fully outward position, a distance 82 between the head portion 76 of the adjusting screw 60 and the end of the drive screw 58 is approximately 0.480 inches (12.20 mm). As shown in FIG. 10, the drive screw 58 has traveled a distance 80 of approximately 0.098 inches (2.500 mm) after five wrench turns until the flange 70 engages a shoulder 86 of a pocket 88 of the cartridge 20, while the adjusting screw 60 has traveled a distance 84 of approximately 0.010 inches (0.250 mm). Thus, the distance of approximately 0.50 mm that the boring cartridge 20 is adjusted outwardly is equal to the number of turns made by the drive screw 28 multiplied by the difference between the pitches of the internal threads 34 and the external threads 35 of the drive screw 28 (i.e., 5 times 0.10 mm=0.50 mm). It will be appreciated that the number of wrench turns that are required to cause the boring cartridge 20 to move a predetermined distance can be selectively adjusted by varying the difference between the pitches of the internal threads 34 and the external threads 35 of the drive screw 28.

By virtue of the foregoing construction, the boring cartridge 20 may be reduced substantially in length to approximately 2.156 inches (54.750 mm) without any corresponding loss in the range of fine adjustment provided by the axial and radial screw assemblies 22, 24. In addition, the exemplary boring cartridge 20 may be used in the boring bar 10 with a diameter that is substantially smaller than prior boring bars having generally similar cutting insert mountings with the exemplary boring cartridge 20, while still providing a full range of fine adjustment. Alternatively, the axial and radial screw assemblies 22, 24 can be mounted directly to the boring bar 10 with a diameter that is substantially smaller than prior boring bars.

Figure 12:
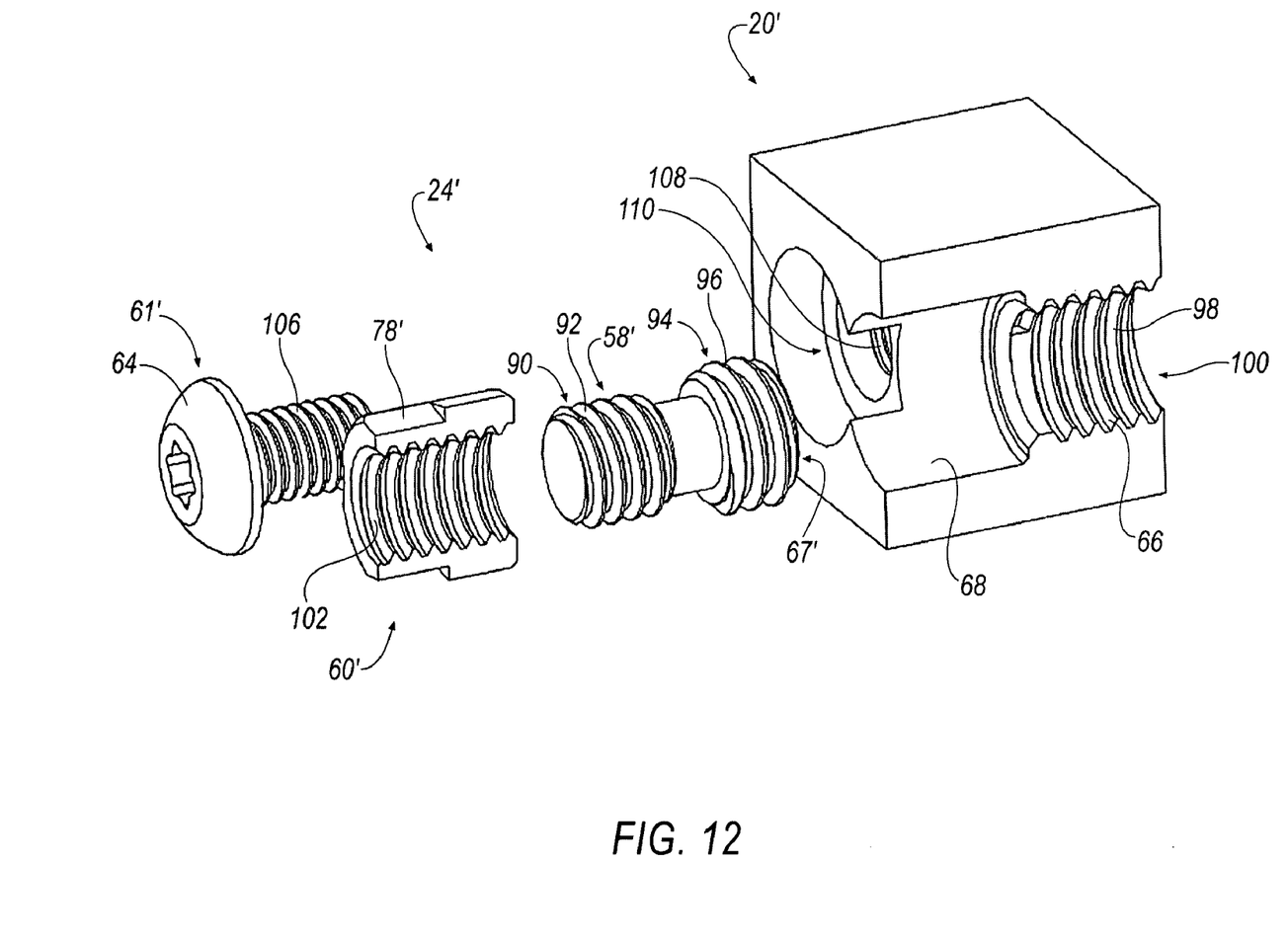
FIG. 12 is an exploded partial cross-sectional view of a radial micro-adjustable differential screw assembly according to an alternate embodiment of the invention.

Referring now to FIG. 12, a radial micro-adjustable differential screw assembly 24' is shown according to another embodiment of the invention. In this embodiment, the radial micro-adjustable screw assembly 24' comprises a rotatable male drive screw 58', a non-rotatable female adjusting piston or screw 60', and an anti-rotation device 61' for preventing rotation of the adjusting screw, such as a screw, a bolt, a pin, and the like. In the illustrated embodiment, the anti-rotation device comprises a screw, such as a button head cap screw, a pan had screw, and the like. The screw 61' includes a head portion 104 and a threaded portion 106 that mates with threads 108 in a bore 10 of the mounting cartridge 20'. Alternatively, the screw 61' can mate with threads in the boring bar 10 when the screw assembly 24' is mounted directly to the boring bar 10.

The drive screw 58' includes a first portion 90 with right-hand external threads 92 having a pitch of approximately 0.7 mm/revolution, and a second portion 94 with right-hand external threads 96 having a pitch of approximately 0.8 mm/revolution for mating with right-hand threads 98 in a bore 100 of the boring cartridge 20'. Alternatively, the drive screw 58' can mate with right-hand threads in a bore of the boring bar 10, rather than with the mounting cartridge 20'. Similar to the drive screw 58, the drive screw 58' may include a head portion or flange (not shown) at one end thereof that acts as a stop and limits travel of the drive screw 58' during operation of the screw assembly 24'. The drive screw 58' also includes a socket 67' for receiving an appropriate tool, such as an Allen wrench and the like, at the other end thereof.

The adjusting screw 60' is generally annular in shape and includes right-hand internal threads 102 having a pitch of approximately 0.7 mm/revolution for mating with the right-hand external threads 92 of the drive screw 58'. The adjusting screw 60' also includes one or more notches 78' along the outer circumference thereof. The one or more notches 78' interface with the head portion 104 of the screw 61' to prevent rotation of the adjusting screw 60'. It will be appreciated that the invention can be practiced with left-hand threads on the drive screw 58' and the adjusting screw 60', rather than the right-hand threads 92, 96, 102 so long as the threads are the same hand.

In operation, as the male drive screw 58' is turned by the appropriate tool, the difference in the pitches of the two threads 92, 96 on the drive screw 58' causes a greatly reduced radial movement of the boring cartridge 20' in relation to the radial movement of the drive screw 58', thereby providing fine adjustment in the radial position of the cutting insert 26. Similar to the cartridge assemblies 22, 24, the distance of approximately 0.50 mm that the boring cartridge 20' is adjusted outwardly is equal to the number of turns made by the drive screw 58' multiplied by the difference between the pitches of the external threads 92, 96 of the drive screw (i.e., 5 times 0.10 mm=0.50 mm).

By virtue of the foregoing construction, the boring cartridge 20' may be reduced substantially in length as compared to the axial and radial screw assemblies 22, 24. In addition, the exemplary boring cartridge 20' may be used in the boring bar 10 with a diameter that is substantially smaller than prior boring bars having generally similar cutting insert mountings with the exemplary boring cartridge 20', while still providing a full range of fine adjustment. Alternatively, the radial screw assemblies 24' can be mounted directly to the boring bar 10 with a diameter that is substantially smaller than prior boring bars.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A boring bar, comprising:
    a shank portion; and
    a head portion with at least one boring cartridge mounted thereto, said at least one boring cartridge including an axial micro-adjustable differential screw assembly for adjusting an axial position of a cutting insert, and a radial micro-adjustable differential screw assembly for adjusting a radial position of said cutting insert, said axial and radial micro-adjustable differential screw assemblies including a rotatable drive screw with a bore having internal threads with a first thread pitch, and external threads with a second thread pitch different than said first thread pitch, and a non-rotatable adjusting screw having external threads with said first thread pitch being received in said bore of said drive screw,
    wherein the difference between the first and second thread pitches causes reduced movement of said at least one boring cartridge in relation to movement of said drive screw, thereby providing fine adjustment of the axial and radial positions of said cutting insert.

2. The boring bar according to claim 1, wherein said first thread pitch is approximately 0.5 mm/revolution, and wherein said second thread pitch is approximately 0.6 mm/revolution.

3. The boring bar according to claim 1, wherein said radial micro-adjustable differential screw assembly further includes an anti-rotation device for preventing rotation of said adjusting screw.

4. A boring cartridge for a boring tool, comprising:
    an axial micro-adjustable differential screw assembly for adjusting an axial position of a cutting insert; and
    a radial micro-adjustable differential screw assembly for adjusting a radial position of said cutting insert,
    wherein said axial and radial micro-adjustable differential screw assemblies include a rotatable drive screw with a bore having internal threads with a first thread pitch, and external threads with a second thread pitch different than said first thread pitch, and a non-rotatable adjusting screw having external threads with said first thread pitch being received in said bore of said drive screw, and wherein the difference between the first and second thread pitches provides fine adjustment of the axial and radial positions of said cutting insert.

5. The boring cartridge according to claim 4, wherein said first thread pitch is approximately 0.5 mm/revolution, and wherein said second thread pitch is approximately 0.6 mm/revolution.

6. The boring cartridge according to claim 4, wherein said radial micro-adjustable differential screw assembly further includes an anti-rotation device for preventing rotation of said adjusting screw.

7. A micro-adjustable differential screw assembly comprising a rotatable drive screw including a shaft portion with a bore having internal threads with a first thread pitch and external threads with a second thread pitch different than said first thread pitch, and a non-rotatable adjusting screw including a shaft portion having external threads with said first thread pitch, said shaft portion of said adjusting screw being received in said bore of said drive screw, wherein the difference between the first and second thread pitches provides fine adjustment of axial and radial positions of a cutting insert.

8. The screw assembly according to claim 7, wherein said first thread pitch is approximately 0.5 mm/revolution, and wherein said second thread pitch is approximately 0.6 mm/revolution.

9. The screw assembly according to claim 7, wherein said drive screw includes a hexagonal head portion for rotating said drive screw.

10. The screw assembly according to claim 7, wherein said drive screw includes a flange at one end thereof that acts as a stop for limiting travel of said drive screw, and wherein said drive screw also includes a socket for rotating said drive screw.

11. The screw assembly according to claim 7, wherein said adjusting screw includes a substantially square-shaped head portion for preventing rotation of said adjusting screw.

12. The screw assembly according to claim 7, wherein said adjusting screw includes a head portion with one or more notches along an outer circumference that interface with an anti-rotation device for preventing rotation of said adjusting screw.

13. A micro-adjustable differential screw assembly comprising a rotatable drive screw including a shaft portion having external threads with a first thread pitch and a bore having internal threads with a second thread pitch different than said first thread pitch, and a non-rotatable adjusting screw having external threads with said second thread pitch, said non-rotatable adjusting screw being received in said bore of said rotatable drive screw, wherein the difference between the first and second thread pitches provides fine adjustment of axial and radial positions of a cutting insert.

14. The screw assembly according to claim 13, further comprising an anti-rotation device for preventing rotation of said adjusting screw.

15. The screw assembly according to claim 14, wherein said anti-rotation device comprises a screw that interfaces with one or more notches along an outer circumference of said adjusting screw.

* * * * *